(12) United States Patent
Segura

(10) Patent No.: US 7,708,193 B1
(45) Date of Patent: May 4, 2010

(54) SYSTEMS AND METHODS FOR AUTOMATED REWARD REDEMPTION

(75) Inventor: Michele Segura, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 11/459,911

(22) Filed: Jul. 25, 2006

(51) Int. Cl.
*G06K 5/00* (2006.01)
*G06K 15/00* (2006.01)
*G06Q 30/00* (2006.01)
*G07G 1/14* (2006.01)

(52) U.S. Cl. .................. 235/380; 235/375; 235/379; 235/383; 235/491; 235/451; 705/14; 705/16; 705/21; 705/39; 705/64; 705/65; 705/77; 705/79

(58) Field of Classification Search .......... 235/380, 235/382, 382.5, 379, 383, 451, 492, 375; 705/14, 16, 21, 39, 64–65, 77, 79
See application file for complete search history.

(56) References Cited

U.S. PATENT DOCUMENTS

| | | | |
|---|---|---|---|
| 4,882,675 A | | 11/1989 | Nichtberger et al. |
| 5,642,485 A | | 6/1997 | Deaton et al. |
| 5,689,100 A | * | 11/1997 | Carrithers et al. ........... 235/380 |
| 5,905,246 A | | 5/1999 | Fajkowski |
| 6,292,786 B1 | | 9/2001 | Deaton et al. |
| 6,684,269 B2 | | 1/2004 | Wagner |
| 6,885,994 B1 | | 4/2005 | Scroggie et al. |
| 6,920,611 B1 | | 7/2005 | Spaeth et al. |
| 6,993,498 B1 | | 1/2006 | Deaton et al. |
| 7,059,531 B2 | | 6/2006 | Beenau et al. |
| 7,092,905 B2 | | 8/2006 | Behrenbrinker et al. |
| 2003/0009382 A1 | * | 1/2003 | D'Arbeloff et al. ........... 705/17 |
| 2003/0130895 A1 | * | 7/2003 | Antonucci et al. ............ 705/14 |
| 2003/0216967 A1 | * | 11/2003 | Williams ...................... 705/14 |
| 2004/0238622 A1 | * | 12/2004 | Freiberg ..................... 235/380 |
| 2005/0075932 A1 | | 4/2005 | Mankoff |
| 2006/0004629 A1 | | 1/2006 | Neemann et al. |
| 2006/0131392 A1 | * | 6/2006 | Cooper ...................... 235/380 |
| 2006/0224449 A1 | * | 10/2006 | Byerley et al. ............... 705/14 |
| 2006/0289631 A1 | | 12/2006 | Stretch et al. |

(Continued)

OTHER PUBLICATIONS

"Accepting Bill Payments: Increasing Foot Traffic and Turning a Profit", http://www.dataguardsystems.com/white-papers/pdf/cellular-bill-payment-solutions.pdf, (2005),8 p.

(Continued)

*Primary Examiner*—Thien M. Le
*Assistant Examiner*—Tuyen K Vo
(74) *Attorney, Agent, or Firm*—Townsend and Townsend and Crew LLP

(57) ABSTRACT

System and methods for transaction processing using a rewards account are described. The method may include: receiving a transaction containing a transaction type, formatting a message based on the transaction type and sending the message. The method may alternately include, receiving a transaction message and processing a transaction based on a transaction type contained within the transaction message. The system may include one or more software modules performing the following functions: receiving module to receive transactions, transaction processing module to parse the transaction and determine a transaction type, message processing module to format a transaction message based on the transaction type, and a user interface module to provide a user interface to a customer.

20 Claims, 8 Drawing Sheets

U.S. PATENT DOCUMENTS

2008/0010189 A1* 1/2008 Rosenberger ............... 705/39

OTHER PUBLICATIONS

"Citi / AAdvantage Cards", http://www.citibank.com/us/cards/cardserv/worldcard/index.jsp, (Jul. 20, 2006),1 p.

"Complete E-Commerce System", http://www.iventa.com/Ecommerce-System.aspx, (Jul. 20, 2006),4 p.

"E-Commerce Sites", http://www.consistentimage.com/e-commerce.htm, (Jul. 20, 2006),4 p.

"Internet Privacy Statement", http://marriott.com/privacy.mi, (Jul. 20, 2006),10 p.

"Solveras Payment Systems", http://www.nfib.com/object/Complete.html, (Jul. 20, 2006),1 p.

"Sun Story—Success At A Glance: Callidus Software, Inc.", http://www.sun.com/service/grid/CallidusGridSnapshot.pdf, (Mar. 20, 2006),3 p.

"U.S. Appl. No. 11/459,907, Non-Final Office Action mailed Jul. 26, 2007", 13 p.

"U.S. Appl. No. 11/459,916, Non-Final Office Action mailed Jul. 26, 2007", 13 p.

* cited by examiner

SYSTEMS AND METHODS FOR AUTOMATED REWARD REDEMPTION

RELATED APPLICATIONS

This disclosure is related to pending U.S. patent application Ser. No. 11/459,907, titled "SYSTEMS AND METHODS FOR AUTOMATED REWARD REDEMPTION," and U.S. patent application Ser. No. 11/459,916, titled "SYSTEMS AND METHODS FOR AUTOMATED REWARD REDEMPTION," filed on an even date herewith.

TECHNICAL FIELD

This application relates to systems and methods for transaction processing using rewards and more particularly to an automated system for the presentation of rewards during a customer transaction.

BACKGROUND

Customers demand more of the products and services they use than ever before. They insist that the companies they deal with on a regular basis provide them greater and greater levels of information. These companies are maintaining increasingly larger and larger databases of information about their customers enabling them to deliver higher and higher levels of user satisfaction using that information and implement more robust systems of rewards for their users.

Reward, or affinity, programs provide an additional level of service to a company's most valued customers. By incenting those customers to use more and more of the company's products by providing them rewards, customers maintain longer and stronger relationships with their customers. One of the most widely known example of a reward program is a frequent flyer program. Customers accumulate miles as they fly more and more with the same airline. They can redeem these miles for free flights, first class upgrades and the like. As rewards programs become more prevalently used by other companies, better methods of providing easy access to those rewards are needed.

SUMMARY

In an embodiment, machine-executable instructions are performed to process transactions from a customer are described and executed on various software modules. The software modules include, a receiving module to receive transactions, a transaction processing module to parse the transaction and determine a transaction type, a message processing module to format a transaction message based on the transaction type and a user interface module to provide a user interface to a customer.

In an embodiment, a method of processing a transaction for a customer is described. The method comprises, receiving a transaction containing a transaction type, parsing the transaction to determine the transaction type, formatting a message based on the transaction type and sending the message.

In an embodiment, a method of processing a transaction message is described. The method comprises, receiving a transaction message, determining if the transaction message is a reward transaction message and processing a transaction using a rewards account if the transaction message is a reward transaction message. The method additionally comprises, in some examples, determining if rewards are available, selecting an alternate account if rewards are not available, and formatting a transaction message based on the alternate account.

BRIEF DESCRIPTION OF DRAWINGS

Embodiments are illustrated by way of example and not limitation in the figures of the accompanying drawings, in which like references indicate similar elements and in which.

DETAILED DESCRIPTION

In the following detailed description of example embodiments, reference is made to the accompanying drawings, which form a part hereof, and in which is shown, by way of illustration, specific embodiments in which the example method, apparatus, and system may be practiced. It is to be understood that other embodiments may be utilized and structural changes may be made without departing from the scope of this description.

Figure 1A:
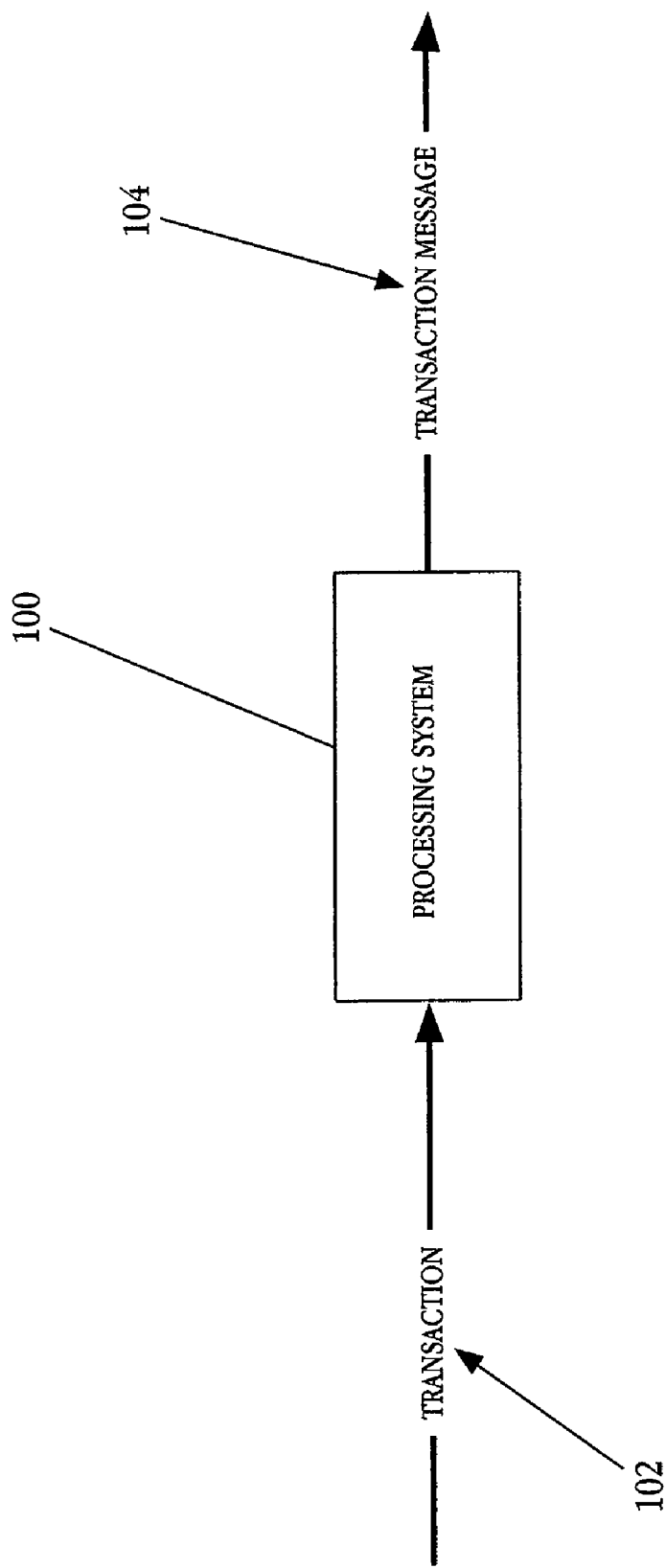
FIG. 1A shows a high level block diagram of an apparatus for a reward transaction engine, in accordance with an example embodiment.

FIG. 1A shows a high level block diagram of an apparatus for a reward transaction engine, in accordance with an example embodiment. In an embodiment, a processing system 100 receives a transaction 102 as an input and formats and sends a transaction message 104 as an output. The transaction may include, without limitation, the purchase of goods or services by a customer using a payment device. The payment device may include, without limitation, a credit card, a debit card, charge card, stored value card, gift card or any other suitable payment mechanism. In a further embodiment, the payment device has an associated rewards program which has the ability to accumulate a value that can be redeemed by the holder of the payment device for the purchase of goods or services.

In an embodiment, the transaction 102 received as an input has an associated transaction type. The transaction type may be one of the following, credit card transaction, debit card transaction or a reward transaction, in some examples. A credit card transaction is a transaction where the customer presents a credit card to be used for the purchase of goods or services. The credit card is issued by an issuing entity to the customer based on the customer's acceptance of the terms of the credit card. Typically, the credit card agreement between a customer and an issuing entity details the obligation of the issuing entity to pay for transactions using the credit card, and the customer to repay the issuing entity for those transactions sometime after the actual purchase. This may include, as will be well understood by those skilled in the art, an additional fee for the convenience of not having to have adequate cash available at the time of purchase. A debit card is a type of payment device that deducts, the purchase amount directly from a financial account of the customer, at the time of purchase. These are sometimes called check cards as they function as a check at the time of purchase. Provided the customer has sufficient funds to cover the transaction, which is checked at the time of purchase, the transaction can be processed and the merchant paid at some point in the future.

In another embodiment, either a credit card a debit card, or a separate payment device, may have a reward associated therewith. Financial institutions use rewards programs to incentivize their customers to remain with them over time. There are a myriad number of programs available to customers, and use of any of them are considered to be within the scope of the present discussion, provided the reward is one that can be redeemed for some cash value through any suitable mechanism. One example is a cash-back reward program. In this type of program, a percentage of the customer's purchases are rebated to them. For instance, if the customer spends $10,000 using that payment device, they may receive 2% of those purchases back, or $200. The $200 they earn by using that particular payment device may be returned to them in the form of a check mailed to them. The rewards may alternately be maintained in a separate account, where the customer through a positive action redeems them at some point in the future. In an embodiment, using the systems and methods described herein, the reward may be redeemed at the point of purchase to pay for the present purchase.

In any of the above embodiments, the processing system 100 receiving the transaction 102 formats a transaction message 104 which contains at least the transaction type. As will be discussed below, the message is generated at the point of sale and sent to a bank associated with the point of sale, or merchant bank. Using the transaction type as an indicator of the type of processing required, the merchant bank receives the transaction message and processes it accordingly.

Figure 1B:
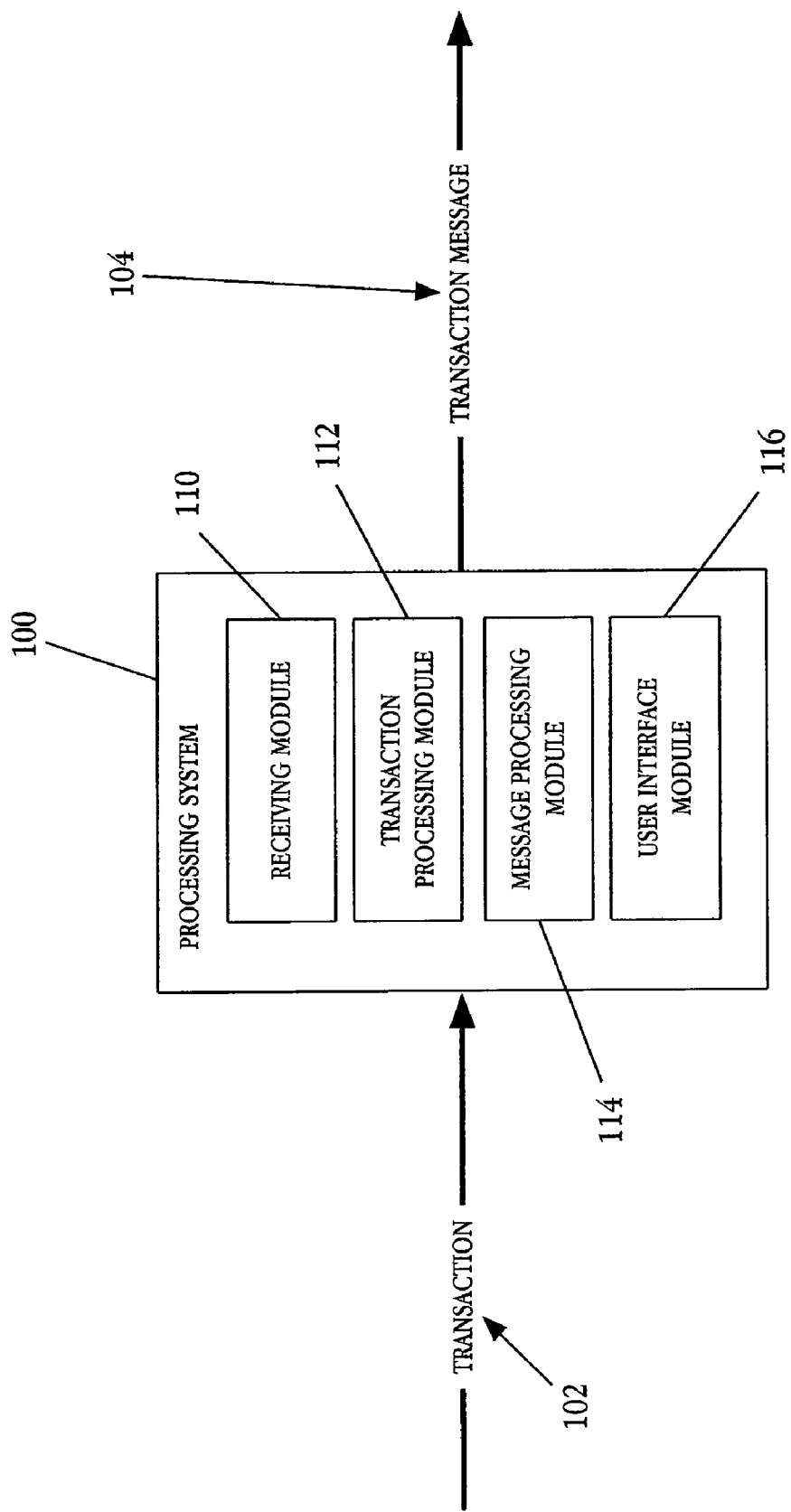
FIG. 1B shows a more detailed block diagram of an apparatus for a reward transaction engine, in accordance with an example embodiment

FIG. 1B shows a more detailed block diagram of an apparatus for a reward transaction engine, in accordance with an example embodiment. In an embodiment, the apparatus depicted in FIG. 1B may be implemented at a point of sale location, the point of sale location including, without limitation, a physical point of sale (hereinafter referred to as a register), or a virtual point of sale enabled through a network such as a web-enabled e-commerce site (hereinafter referred to as web register). In an embodiment, the processing system 100 includes a receiving module 110, a transaction processing module 112, a message processing module 114 and a user interface module 116.

In an embodiment, the user interface module 116 is configured to format and present a user interface to a customer that desires to purchase a good or service. This may include, using a point of sale device, such as those used prevalently in the industry at merchant locations, or instructions intended to cause a customer's web browser to display the user interface. In either case, the user interface module 116 is configured to at least present the customer with a choice of transaction type, using any suitable method, as described above. The user interface module 116, upon receiving that choice and other assorted transaction message information will pass all of it to the receiving module. The choice and other assorted information may collectively be called a transaction 102, in some examples.

The receiving module 110 is configured to receive a transaction message. The transaction 102 includes at least a transaction type. Additionally, the transaction 102 may contain other information associated with the purchase, such as account number, vendor identification, amount of purchase, and the like. Mention of specific information is merely illustrative, as other information specific to the purchase or vendor may be included without departing from the scope of the present discussion. Within the context of the present discussion, the transaction type is required to be received by the receiving module 110 within the transaction 102.

The transaction processing module 112 is configured to receive the transaction and parse information from the transaction. The parsing of information may be performed using any suitable method. The information, once parsed, is passed to the message processing module 114, which is configured to properly format a message suitable for upstream processing by a merchant bank or issuing entity. The actual mechanism and protocols employed to transmit a transaction message from a vendor location to a merchant bank or issuing entity are outside the scope of the present discussion and any suitable mechanism or protocol may be used so long as the minimal information discussed above are present in the message.

Figure 2:
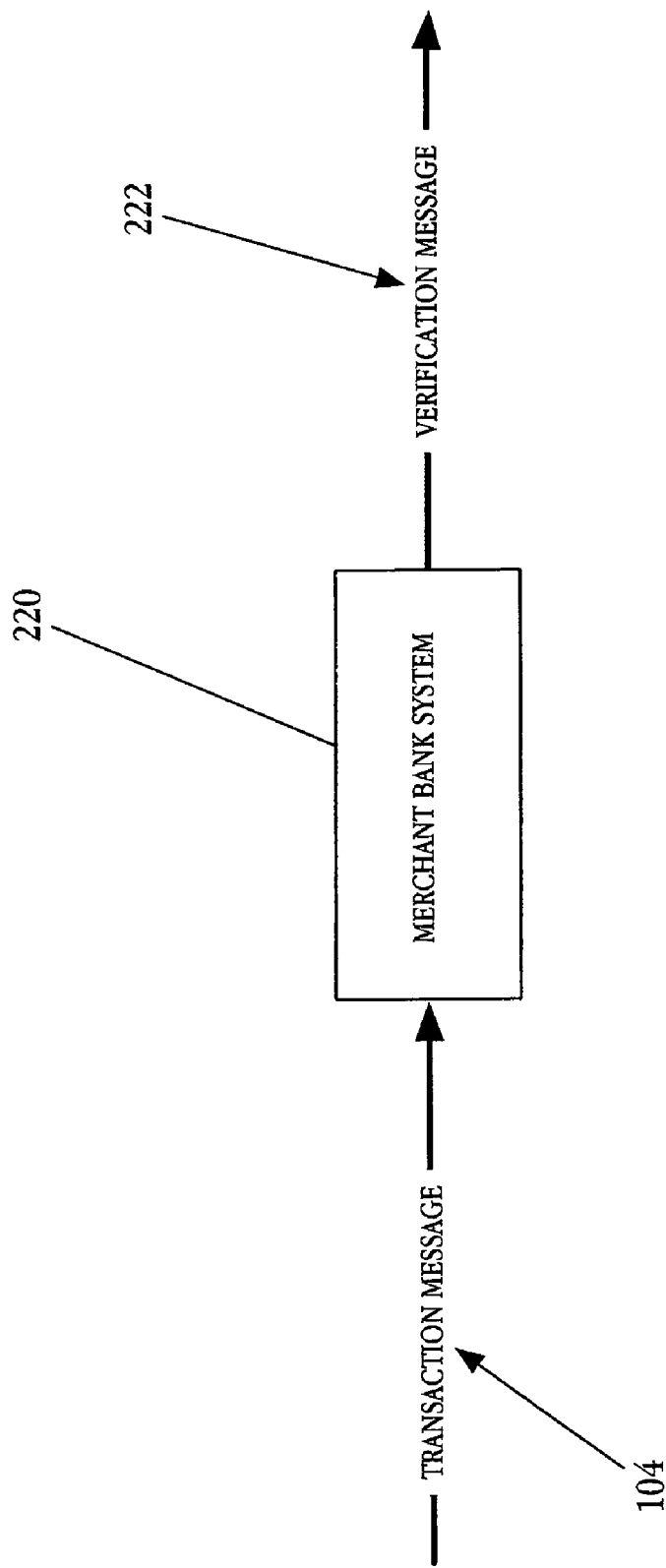
FIG. 2 shows a high-level block diagram of an apparatus for the processing of a transaction message, in accordance with an example embodiment.

FIG. 2 shows a high-level block diagram of an apparatus for the processing of a transaction message, in accordance with an example embodiment. In an embodiment, a merchant bank system 220 receives a transaction message 104 as in input and outputs a verification message 222. The transaction message 104 is output by the processing system 100 described above with respect to FIG. 1A and FIG. 1B, in one example.

In an embodiment, the merchant bank system 220 is operated by a merchant bank that has a contractual agreement with the vendor operating the processing system 100, the agreement providing that the merchant bank will handle and process some or all of the payment device transactions received by the vendor bank. Additionally, the agreement may provide that the merchant bank bear some financial responsibility to the vendor in the case a fraudulent payment device is presented and approved by the merchant bank. Through this agreement, the vendor need not worry about maintaining their own verification and fraud response systems. The merchant bank may have a contractual agreement with more then one vendor, in some examples. In one embodiment, the merchant bank system receives the transaction message 104 from the vendor, wherein the transaction message contains a transaction type, the transaction type including one of the following: credit card transaction, debit card transaction, or reward transaction.

In an embodiment, the merchant bank system 220 further processes the transaction message to determine the entity that issued the payment device presented for payment, including a reward payment device, as described above. By determining the entity that issued the payment device, or issuing bank, the verification message 222 can be properly addressed for transmission. The verification message 222 contains a transaction type, as described above, in one example.

Figure 3:
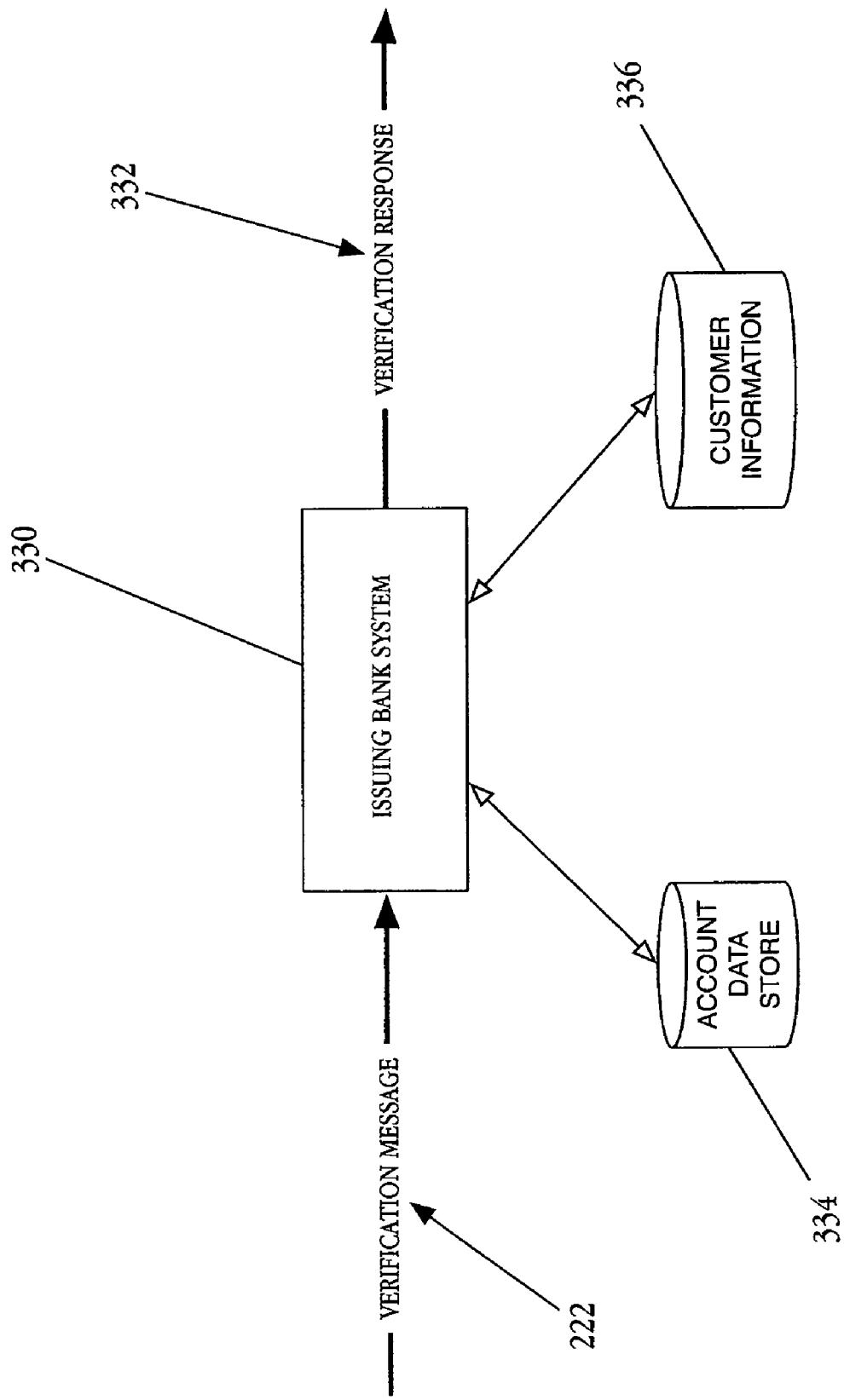
FIG. 3 shows a high-level block diagram of an apparatus for the processing of a verification message, in accordance with an example embodiment.

FIG. 3 shows a high-level block diagram of an apparatus for the processing of a verification message, in accordance with an example embodiment. In an embodiment, an issuing bank system 330 receives a verification message 222 as an input and outputs a verification response 332. The issuing bank system is communicatively coupled, in some examples, to an account data store 334 and customer information 336. The verification message is output by the merchant bank system described above with respect to FIG. 2, in one example.

In an embodiment, the issuing bank system 330 is operated by an issuing bank. The issuing bank provides payment devices to one or more customers and agrees, as discussed above, to provide funds to cover the purchase of goods or services made by the customer, in exchange for the customer's agreement to pay for those purchases at some point In an embodiment, the issuing bank system 330 receives the verification message 222, which, in one example, is a request from the merchant bank to verify the authenticity of the payment device presented and to further verify that funds are available, either in the customer's own accounts, or from the issuing bank itself, to cover the entirety of the purchase. The issuing bank system 330 outputs a verification response 332, which contains an approval/denial indication. In the context of a reward transaction type, the verification response may additionally contain information specific to a reward transaction, in one example. As there are many types of reward programs available to consumers, some of which have no direct cash value, the verification response 332 should contain an amount of rewards to be withdrawn from that customers account. For instance, a rewards program may maintain a balance of rewards point, with the customer getting 5 points for each transaction, and every 50 points is worth $20 in cash value. When presenting their rewards card for a purchase of $20, the verification response should contain an indication that 50 points should be deducted from the rewards account of that customer.

In a further embodiment, the issuing bank system 330 is communicatively coupled to an account data store 334. The account data store 334, in one example, maintains information with regards to an account associated with the payment device. With respect to a credit card, this may include the amount of credit available for purchases, maximum amount of transaction, and the like. Additionally, the issuing bank system 330 is communicatively coupled to customer information 336. In one embodiment, the issuing bank system 330 is configured to determine if rewards are available to cover the purchase of goods or services by the customer. If rewards are not available, the issuing bank system 330 may, in one example, attempt to use other payment devices of the customer by retrieving information about those accounts from the customer information 336. In such an example, each of those accounts may have a distinct account data store associated with it. However, the account data store 334 may contain information about all of the accounts of the customer associated with all payment devices issued by the issuing bank, in some examples. In either case, the operations performed by the issuing bank system 330 may be iterative, in some examples, as a rewards transaction is unable to be completed, but other payment devices are available to provide the ability for the customer to complete the purchase. This may also include operations performed by the issuing bank system 330 to step through all available accounts of the customer before returning a denied verification response 332.

Figure 4:
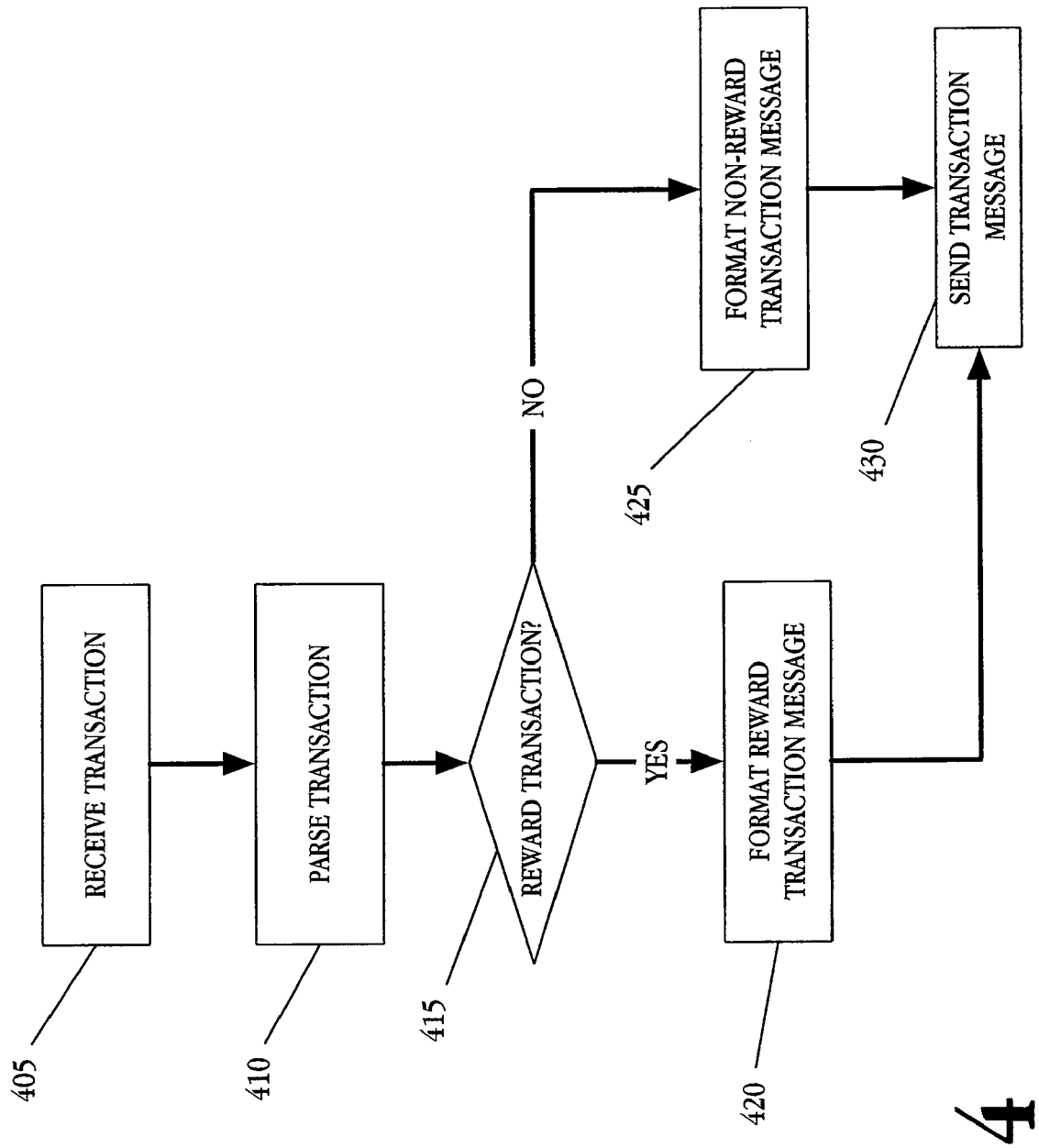
FIG. 4 shows a flowchart of a method of processing a transaction message, in accordance with an example embodiment.

FIG. 4 shows a flowchart of a method of processing a transaction message, in accordance with an example embodiment. The method depicted in FIG. 4 may be carried out by the apparatus described above with respect to FIG. 1A and FIG. 1B, in one embodiment. In an alternate embodiment, the method depicted in FIG. 4 may be carried out by the apparatus described above with respect to FIG. 2.

At block 405, a transaction is received. In a first embodiment, the transaction 102 is received by a processing system 100 at a point of sale. In an alternate embodiment, the transaction received at block 405 is a transaction message 104 and received by a merchant bank system 220 as described above. The transaction may be received by a point of sale device at a merchant location, or over the internet from a customer's computing device, in two examples. In the latter example, the merchant enables an online store from which the customer can select one or more items for purchase, and pay for them through an online interface. In such an arrangement, the operations to verify that the customer is able to pay for the good or service using the payment device presented are substantially similar to those operations following the presenting of the payment device at a point of sale.

At block 410, the transaction is parsed to determine the payment type. The payment type may include, without limitation, a credit card, debit card, check or a reward transaction. If the payment type is a reward transaction, as determined at block 415, a reward transaction message is formatted at block 420. If the transaction is not a reward transaction, a non-reward transaction message is formatted at block 425. In either example, the transaction message is sent at block 430. Any suitable methods to send transaction messages between a merchant and a merchant bank, or between a merchant bank and the issuing bank, are considered to be within the scope of the present discussion.

Figure 5:
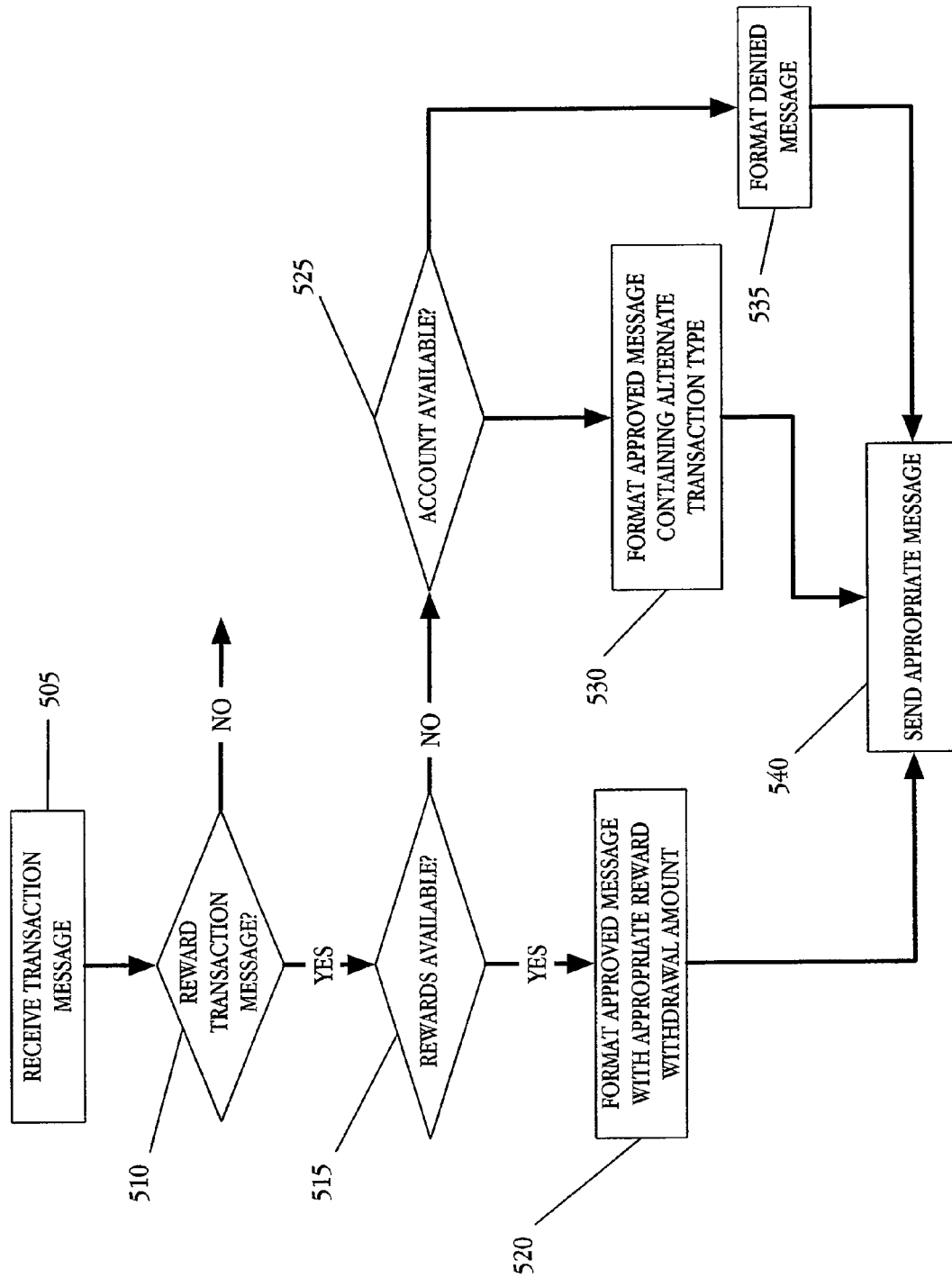
FIG. 5 shows a flowchart of a method of processing a transaction message, in accordance with an example embodiment.

FIG. 5 shows a flowchart of a method of processing a transaction message, in accordance with an example embodiment. The method depicted in FIG. 5 may be carried out by the apparatus described above with respect to FIG. 3, in one embodiment.

At block 505, a transaction message is received by the issuing bank system 330. This transaction message is substantially similar to that described above with respect to FIG. 4. The transaction message contains at least a transaction type. The transaction type includes, without limitation, a credit card transaction, a debit card transaction, a checking transaction or a reward transaction. The issuing bank system 330 determines at block 510 if the transaction message is a reward transaction message. If the transaction message is a reward transaction message, the issuing bank system 330 determines at block 515 if a reward is available to pay for the good or service desired by the customer. As discussed above, an amount of reward available to a customer may be expressed in any number of ways, only one of which is a direct corollary to a monetary value. In that example, the determination that rewards are available are as simple as comparing the amount of the purchase to the monetary amount available. If the rewards are provided to the customer based on a point system, the determination at block 515 may include a conversion of points to a monetary value as a preliminary step. Another example may be that the customer as part of their rewards program is afforded the opportunity to purchase one good or service during a regular time period. The determination at block 515 would then include a verification that the customer has not availed themselves of that opportunity during the present time period and that they have satisfied any other conditions of that offer.

At block 520, a message indicating the approval of the reward transaction is formatted. In one embodiment, the message is formatted to include some amount of rewards to be withdrawn to satisfy the purchase price of the good or service desired by the customer. As discussed above this may be just the monetary amount of the purchase. It may, in other embodiments, include a processing fee in addition to the purchase price, or a reward point value.

At block 525, if rewards are not available, the issuing bank system 330 determines if other accounts may be available to the user. In one example, this may be where a reward is associated with a specific credit card. Though the transaction was received as a reward transaction, the customer may not have sufficient rewards to satisfy the purchase. Instead of the purchase being denied, as it would in current systems, it would be a better user experience if the transaction was processed as a normal credit card transaction using a credit card or other payment device available to the customer. In that situation, the account availability determined at block 525 is a normal operation to determine whether sufficient credit is available in the account to cover the purchase price. In a further embodiment, a service charge for this additional functionality may be added to the purchase price. In an alternate embodiment, the issuing bank system 330 may query the customer information 336 to find other accounts available to the customer. This is similar to the concept of over-draft protection for a checking account, where the over-draft protection is a credit card issued by the same bank that services the credit card. However, the issuing bank system 330 may also query all accounts available to the customer, including, but not limited to, brokerage accounts, savings accounts, credit card accounts, lines of credit and the like. In one example, the customer may indicate specific accounts that can be queried during the account availability determination at block 525. In an alternate example, all accounts maintained by the issuing bank for that customer may be used, without an individual selection by the customer. Through such a mechanism, the customer at the point of sale can be reasonably assured that the transaction can proceed regardless of their reward balance.

If an account is found available at block 525, an approved message is formatted at block 530, the approved message containing information about the alternate account or transaction type. At block 535, a denial message is formatted if there are no other accounts available, as determined at block 525. Regardless of the type of message formatted, the appropriate message is sent from the issuing bank system 330 at block 540 to the system or entity from which the initial transaction message was received at block 505.

Figure 6:
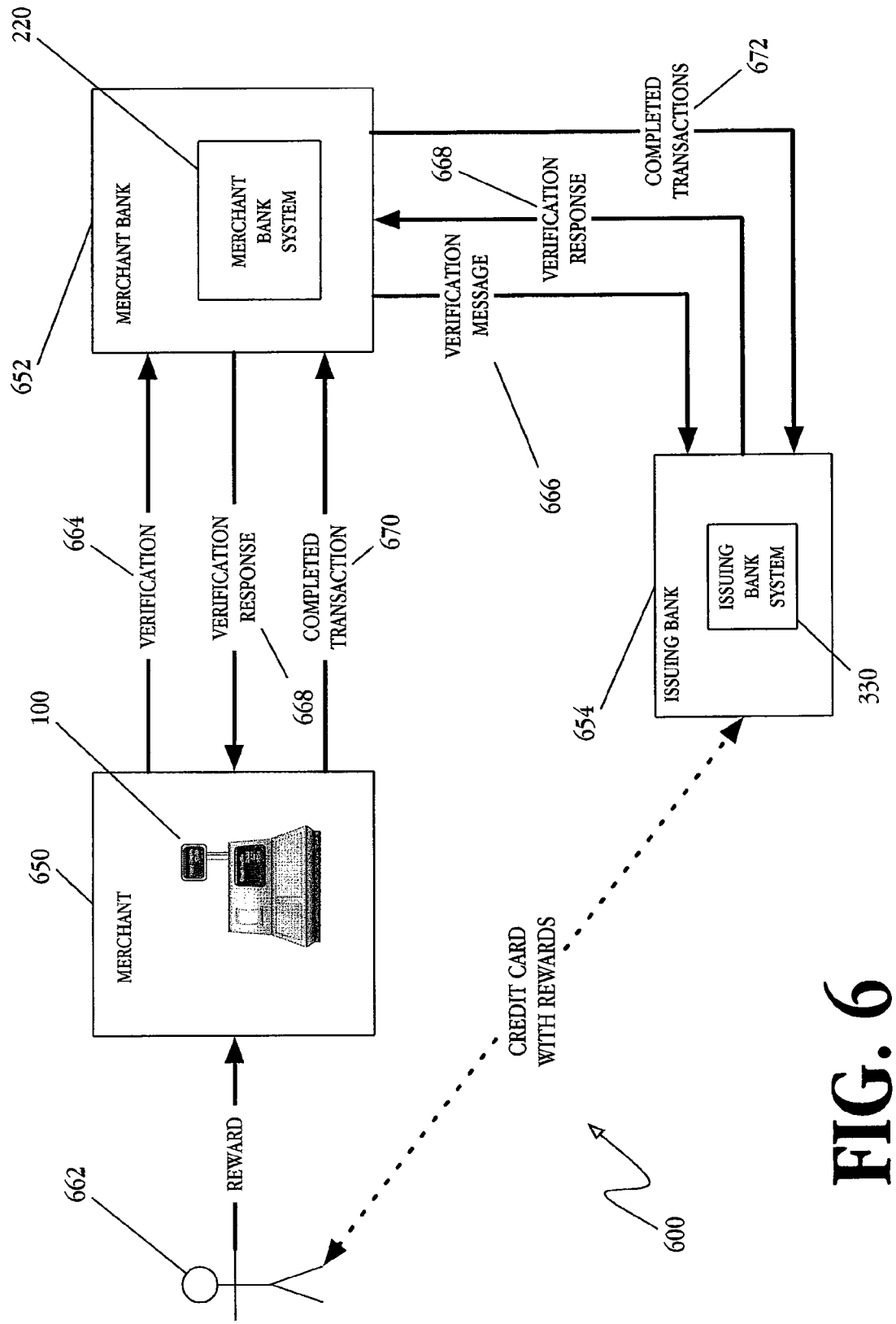
FIG. 6 shows a block diagram of a system that provides automated use and processing of a reward during a transaction, in accordance with an example embodiment.

FIG. 6 shows a block diagram of a system that provides automated use and processing of a reward during a transaction, in accordance with an example embodiment. An example transaction using the methods and apparatus described above may be illustrative of the concepts described herein. At a merchant 650, an apparatus similar to the processing system 100 described above with respect to FIG. 1A and FIG. 1B may be employed. The processing system 100 may use methods such as those described above in FIG. 3, in one embodiment. At a merchant bank 652, an apparatus similar to the merchant bank system 220 described above with respect to FIG. 2 may be employed. The merchant bank system 220 may use methods such as those described above in FIG. 4, in one embodiment. At an issuing bank 654, an apparatus similar to the issuing bank system 330 described above with respect to FIG. 3 may be employed. The issuing bank system 330 may use methods such as those described above in FIG. 5, in one embodiment.

The system 600 includes a customer 662 who desires to purchase a good or service. For the purposes of this example, the customer 662 desires to purchase a stuffed bear for their child. The stuffed bear, in this example, has a purchase price of $25. In this example, the customer 662 has a credit card that has an associated rewards program with the issuing bank 654. Though the rewards program is associated with a specific credit card, the rewards program may also be used with its own unique payment device, in some examples. The customer 662 finds the stuffed bear at the merchant 650, either online or at an actual store. The customer 662 knows that their card has a rewards program and they think they have enough rewards to purchase the stuffed bear. When prompted as to what type of transaction this is, credit card, debit card, or rewards, the customer 662 selects rewards. A transaction message 664 is formatted by the processing system and sent to the merchant bank 652. The merchant bank receives the transaction message 664, processes it using the merchant bank system 220 to format a verification message 666 which is sent to the issuing bank. In addition to the transaction type, the verification message 666 also contains other information associated with the transaction, such as purchase price, vendor, date, and the like. The issuing bank system 330 processes the verification message 666 and replies to the merchant bank with a verification response 668.

In this example, the issuing bank system 330 determines if rewards are available for the customer 662. In this example, the rewards program has exact monetary value rewards, meaning that if the customer 662 has $50 in rewards, they have the ability to purchase a good or service costing as much as $50 using the program. As discussed above, the issuing bank system 330 may use alternate accounts if sufficient rewards are not available to the customer 662. In this example, the customer has $50 in rewards. The issuing bank system 330 formats an approved message containing $25 as the withdrawal amount to cover the transaction. The withdrawal amount may also include an additional fee for processing, in some examples. In this particular example, the rewards program has no such fee. The formatted approval message is sent as a verification response 668 to the merchant bank 652, which then sends the message to the merchant 650. At the point of sale, an approval is generated and the purchase is allowed to proceed. Once the customer 662 signs or indicates their acceptance of the transaction, a completed transaction 670 is sent to the merchant bank 652. The completed transaction 670 is a recording of all of the details of the transaction. This may include the full reward value to be withdrawn, as discussed above, including any service fees. The merchant bank 652 stores the completed transaction 670 for batch processing at a later time. Through this mechanism, the merchant bank can aggregate all transactions over a period of time and transmit them to the appropriate issuing banks as completed transactions 672. The issuing bank 654 can them process funds transfers such that the merchants can be paid for the goods and services purchased by customers of the issuing bank 654.

Figure 7:
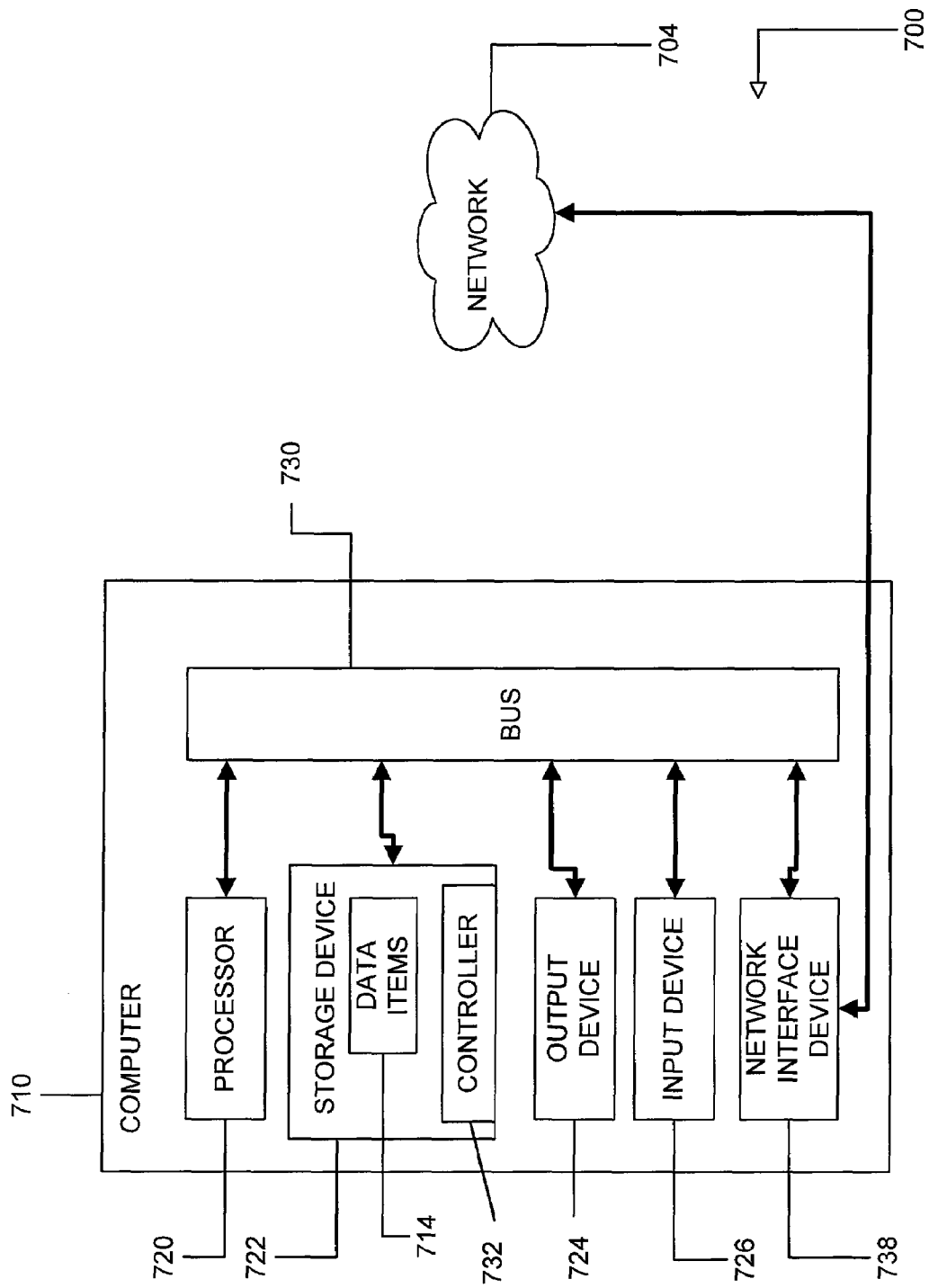
FIG. 7 shows a block diagram of a machine including instructions to perform any one or more of the methodologies described herein.

FIG. 7 shows a block diagram of a machine including instructions to perform any one or more of the methodologies described herein. A system 700 includes a computer 710 connected to a network 704. The computer 710 includes a processor 720, a storage device 722, an output device 724, an input device 726, and a network interface device 728, all connected via a bus 730. The processor 720 represents a central processing unit of any type of architecture, such as a CISC (Complex Instruction Set Computing), RISC (Reduced Instruction Set Computing), VLIW (Very Long Instruction Word), or a hybrid architecture, although any appropriate processor may be used. The processor 720 executes instructions and includes that portion of the computer 710 that controls the operation of the entire computer. Although not depicted in FIG. 7, the processor 720 typically includes a control unit that organizes data and program storage in memory and transfers data and other information between the various parts of the computer 710. The processor 720 receives input data from the input device 726 and the network 704, reads and stores code and data in the storage device 722, and presents data to the output device 724.

Although the computer 710 is shown to contain only a single processor 720 and a single bus 730, the disclosed embodiment applies equally to computers that may have multiple processors, and to computers that may have multiple busses with some or all performing different functions in different ways.

The storage device 722 represents one or more mechanisms for storing data. For example, the storage device 722 may include read only memory (ROM), random access memory (RAM), magnetic disk storage media, optical storage media, flash memory devices, and/or other machine-readable media. In other embodiments, any appropriate type of storage device may be used. Although only one storage device 722 is shown, multiple storage devices and multiple types of storage devices may be present. Further, although the computer 710 is drawn to contain the storage device 722, it may be distributed across other computers, for example on a server.

The storage device 722 includes a controller 732 and data items 714. The controller includes instructions capable of being executed on the processor 720 to carry out the functions, as previously described above with reference to FIGS. 1-6. In another embodiment, some or all of the functions are carried out via hardware in lieu of a processor-based system. In one embodiment, the controller is a web browser, but in other embodiments, the controller may be a database system, a file system, an electronic mail system, a media manager, an image manager, or may include any other functions capable of accessing data items. Of course, the storage device 722 may also contain additional software and data (not shown), which is not necessary to understanding the invention.

Although the controller 732 and the data items 714 are shown to be within the storage device 722 in the computer 710, some or all of them may be distributed across other systems, for example on a server and accessed via the network 704.

The output device 724 is that part of the computer 710 that displays output to the user. The output device 724 may be a liquid crystal display (LCD) well-known in the art of computer hardware. But, in other embodiments the output device 724 may be replaced with a gas or plasma-based flat-panel display or a traditional cathode-ray tube (CRT) display. In still other embodiments, any appropriate display device may be used. Although only one output device 724 is shown, in other embodiments any number of output devices of different types, or of the same type, may be present. In an embodiment, the output device 724 displays a user interface.

The input device 726 may be a keyboard, mouse or other pointing device, trackball, touchpad, touch screen, keypad, microphone, voice recognition device, or any other appropriate mechanism for the user to input data to the computer 710 and manipulate the user interface previously discussed. Although only one input device 726 is shown, in another embodiment any number and type of input devices may be present.

The network interface device 738 provides connectivity from the computer 710 to the network 704 through any suitable communications protocol. The network interface device 738 sends and receives data items from the network 704.

The bus 730 may represent one or more busses, e.g., USB (Universal Serial Bus), PCI, ISA (Industry Standard Architecture), X-Bus, EISA (Extended Industry Standard Architecture), or any other appropriate bus and/or bridge (also called a bus controller).

The computer 710 may be implemented using any suitable hardware and/or software, such as a personal computer or other electronic computing device. Portable computers, laptop or notebook computers, PDAs (Personal Digital Assistants), pocket computers, appliances, telephones, and mainframe computers are examples of other possible configurations of the computer 710. For example, other peripheral devices such as audio adapters or chip programming devices, such as EPROM (Erasable Programmable Read-Only Memory) programming devices may be used in addition to, or in place of, the hardware already depicted.

The network 704 may be any suitable network and may support any appropriate protocol suitable for communication to the computer 710. In an embodiment, the network 704 may support wireless communications. In another embodiment, the network 704 may support hard-wired communications, such as a telephone line or cable. In another embodiment, the network 704 may support the Ethernet IEEE (Institute of Electrical and Electronics Engineers) 802.3x specification. In another embodiment, the network 704 may be the Internet and may support IP (Internet Protocol). In another embodiment, the network 704 may be a local area network (LAN) or a wide area network (WAN). In another embodiment, the network 704 may be a hotspot service provider network. In another embodiment, the network 704 may be an intranet. In another embodiment, the network 704 may be a GPRS (General Packet Radio Service) network. In another embodiment, the network 704 may be any appropriate cellular data network or cell-based radio network technology. In another embodiment, the network 704 may be an IEEE 802.11 wireless network. In still another embodiment, the network 704 may be any suitable network or combination of networks. Although one network 704 is shown, in other embodiments any number of networks (of the same or different types) may be present.

The embodiments described herein may be implemented in an operating environment comprising software installed on any programmable device, in hardware, or in a combination of software and hardware.

Although embodiments have been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A machine-readable medium that processes transactions from a customer on a computer system having software modules that comprise:

a receiving module to receive transactions from a customer, the transactions detailing payment for goods or services;

a transaction processing module coupled to the receiving module to parse the transaction to determine the transaction type and pass the transaction type and the transaction to a message processing module, the transaction type including at least one of the following: credit card transaction, debit card transaction, or reward card transaction;

the message processing module to properly format a transaction message based on the transaction type, the formatted transaction message including a reward transaction message or non-reward transaction message, the transaction message configured to be sent to a financial entity for further processing;

a user interface module coupled to the receiving module to provide an interface to the customer within which the transaction can be formatted; and a query module to receive a verification response from the financial entity, the verification response including information on at least two other accounts available to and presented during the transaction to the customer from the financial entity if a rewards account associated with the customer does not cover the transaction.

2. The apparatus of claim 1, wherein the user interface module is configured to format and transmit instructions executable by a suitable web browser, the instructions intended to provide the customer the ability to provide payment information for a purchase of goods or service.

3. The apparatus of claim 1, wherein the financial entity is a merchant bank.

4. The apparatus of claim 1, wherein the financial entity is an issuing bank.

5. The apparatus of claim 1, wherein the transaction additionally contains at least one of the following: account number, vendor identification, and amount of purchase.

6. The apparatus of claim 1, wherein the user interface module is a point of sale device at a merchant location.

7. A computer implemented system for processing transactions from a customer, the computer implemented system comprising:
   a processor;
   a storage device having machine-readable instructions contained therein which execute to cause the processor to execute the following software modules:
      receiving module to receive transactions from a customer, the transactions detailing payment for goods or services;
      a transaction processing module coupled to the receiving module to parse the transaction to determine the transaction type and pass the transaction type and the transaction to a message processing module, the transaction type including at least one of the following: credit card transaction, debit card transaction, or reward card transaction;
      the message processing module to properly format a transaction message based on the transaction type, the transaction message configured to be sent to a financial entity for further processing;
      a user interface module coupled to the receiving module to provide an interface to the customer within which the transaction can be formatted; and
      a query module to receive a verification response from the financial entity, the verification response including information on at least two other accounts available to and presented during the transaction to the customer from the financial entity if a rewards account associated with the customer does not cover the transaction.

8. The apparatus of claim 7, wherein the user interface module is configured to format and transmit instructions executable by a suitable web browser, the instructions intended to provide the customer the ability to provide payment information for a purchase of goods or service.

9. The apparatus of claim 7, wherein the financial entity is a merchant bank.

10. The apparatus of claim 7, wherein the financial entity is an issuing bank.

11. The apparatus of claim 7, wherein the transaction additionally contains at least one of the following: account number, vendor identification, and amount of purchase.

12. The apparatus of claim 7, wherein the user interface module is a point of sale device at a merchant location.

13. A computer implemented method of processing transactions from a customer, the method comprising:
   receiving, from a customer, a transaction, the transaction detailing payment for a good or service in a computer system;
   processing the transaction with the computer system, the processing to include parsing the transaction to determine the transaction type, the transaction type including at least one of the following: credit card transaction, debit card transaction and reward card transaction;
   formatting a transaction message with the computer system based on the transaction type, the formatted transaction message including a reward transaction message or a non-reward transaction message, the transaction message to be sent to a financial entity for further processing;
   sending the formatted transaction message to the financial entity with the computer system;
   receiving a verification response from the financial entity with the computer system, the verification response including information on at least two other accounts available to the customer from the financial entity if a rewards account associated with the customer does not cover the transaction; and
   querying the customer with the computer system via a user interface for a selection as to which of the at least two other accounts from the issuing bank to use to complete the reward transaction.

14. The method of claim 13, wherein the transaction received from the customer is received from a web browser operating on a computing device of the customer.

15. The method of claim 13, wherein the financial entity is a merchant bank.

16. The method of claim 13, wherein the financial entity is an issuing bank.

17. The method of claim 13, wherein the transaction additionally contains at least one of the following: account number, vendor identification, and amount of purchase.

18. The method of claim 13, wherein the transaction received from the customer is received via a point of sale device at merchant location.

19. The method of claim 13, wherein formatting a transaction message based on the transaction type includes formatting the transaction message for communication to a merchant bank.

20. The method of claim 13, wherein formatting a transaction message based on the transaction includes formatting the transaction message into the reward transaction message if the transaction type is a reward transaction and formatting the transaction message into the non-reward transaction message if the transaction type is not a reward transaction.

* * * * *